United States Patent
S S et al.

(10) Patent No.: US 10,678,554 B2
(45) Date of Patent: Jun. 9, 2020

(54) ASSEMBLING OPERATING SYSTEM VOLUMES

(71) Applicant: HEWLETT PACKARD ENTERPRISE DEVELOPMENT LP, Houston, TX (US)

(72) Inventors: Harish S S, Karnataka (IN); Niranjan D R, Karnataka (IN); Manasa C, Karnataka (IN); Badriprasad V, Karnataka (IN); Jyothi N, Karnataka (IN); Uma Shankar V D, Karnataka (IN); Santosh Ishwar Revanaki, Karnataka (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 146 days.

(21) Appl. No.: 15/756,570

(22) PCT Filed: Apr. 28, 2016

(86) PCT No.: PCT/US2016/029783
§ 371 (c)(1),
(2) Date: Feb. 28, 2018

(87) PCT Pub. No.: WO2017/138966
PCT Pub. Date: Aug. 17, 2017

(65) Prior Publication Data
US 2018/0239613 A1    Aug. 23, 2018

(30) Foreign Application Priority Data
Feb. 12, 2016    (IN) .............................. 201641005072

(51) Int. Cl.
G06F 9/445      (2018.01)
G06F 9/4401     (2018.01)
(Continued)

(52) U.S. Cl.
CPC .......... *G06F 9/4406* (2013.01); *G06F 3/0604* (2013.01); *G06F 3/065* (2013.01);
(Continued)

(58) Field of Classification Search
CPC ............................ G06F 9/4406; G06F 3/0604
(Continued)

(56) References Cited

U.S. PATENT DOCUMENTS 4,847,830 A    7/1989  Momirov
6,801,952 B2   10/2004 Belzile
(Continued)

FOREIGN PATENT DOCUMENTS

| CN | 101620515 A | 1/2010 |
|---|---|---|
| CN | 103914647 A | 7/2014 |
| CN | 105027070 A | 11/2015 |

OTHER PUBLICATIONS

Atilla Ergüzen et al. "Developing a File System Structure to Solve Healthy Big Data Storage and Archiving Problems Using a Distributed File System"—Department of Computer Engineering, Faculty of Engineering, Kirikkale University Ankara Yolu. Published: Jun. 2, 2018.*

(Continued)

*Primary Examiner* — Francisco J Aponte
(74) *Attorney, Agent, or Firm* — Hewlett Packard Enterprise Patent Department

(57) ABSTRACT

Some examples provide a system including neighboring computing devices comprising a deployed operating system (OS) volumes, and respective neighboring bit tables corresponding to the deployed OS volumes. The system may include a target computing device comprising a target operating system (OS) volume. The target computing device may determine a target bit table corresponding to the target OS volume. Each bit in the target bit table indicates whether the (Continued)

data block of the target OS volume differs relative to a base OS volume. The target computing device may determine, based on bit tables, a first set of data blocks that are identical to a second set of data blocks of the deployed OS volumes. The target computing device may receive the least one data block in the second set of data blocks from the neighboring computing devices, and assemble the target OS.

12 Claims, 7 Drawing Sheets

(51) Int. Cl.
    *G06F 9/44*         (2018.01)
    *G06F 8/61*         (2018.01)
    *G06F 3/06*         (2006.01)

(52) U.S. Cl.
    CPC ............ *G06F 3/067* (2013.01); *G06F 3/0644* (2013.01); *G06F 8/63* (2013.01); *G06F 9/44* (2013.01); *G06F 9/44505* (2013.01)

(58) Field of Classification Search
    USPC ........................................................ 717/174
    See application file for complete search history.

(56) References Cited

U.S. PATENT DOCUMENTS

| | | | |
|---|---|---|---|
| 7,174,385 B2 | 2/2007 | Li | |
| 7,213,065 B2 | 5/2007 | Watt | |
| 7,389,300 B1* | 6/2008 | Shah | G06F 11/1482 |
| 7,502,803 B2* | 3/2009 | Culter | G06F 9/4411 |
| 7,614,050 B2 | 11/2009 | Sasaki et al. | |
| 7,676,506 B2* | 3/2010 | Reinsch | G06F 8/658 |
| | | | 717/169 |
| 7,783,850 B2* | 8/2010 | Vu | G06F 3/0617 |
| | | | 707/639 |
| 7,945,726 B2* | 5/2011 | Faibish | G06F 3/061 |
| | | | 711/112 |
| 8,214,609 B2* | 7/2012 | Bomma | G06F 9/45537 |
| | | | 711/152 |
| 8,412,682 B2* | 4/2013 | Zheng | G06F 3/0608 |
| | | | 707/687 |
| 8,838,793 B1 | 9/2014 | Thrasher et al. | |
| 8,909,883 B2* | 12/2014 | Mizuno | G06F 3/0611 |
| | | | 707/639 |
| 8,959,061 B1 | 2/2015 | Dutch et al. | |
| 9,329,803 B1* | 5/2016 | Bono | G06F 3/0688 |
| 9,336,818 B1* | 5/2016 | Dunn | G11B 27/36 |
| 9,437,232 B1* | 9/2016 | Galbraith | G11B 5/59627 |
| 9,672,151 B1* | 6/2017 | Ma | G06F 3/0683 |
| 10,248,617 B2* | 4/2019 | Starr | G06F 16/113 |
| 10,339,098 B2* | 7/2019 | Starr | G06F 3/0643 |
| 2005/0223210 A1 | 10/2005 | Sasaki et al. | |
| 2006/0064554 A1* | 3/2006 | Fridella | G06F 3/0614 |
| | | | 711/152 |
| 2007/0136548 A1* | 6/2007 | Mane | G06F 16/128 |
| | | | 711/170 |
| 2009/0077327 A1* | 3/2009 | Hara | G06F 3/061 |
| | | | 711/154 |
| 2012/0117241 A1 | 5/2012 | Witt et al. | |
| 2013/0024635 A1* | 1/2013 | Araki | G06F 3/0605 |
| | | | 711/162 |
| 2013/0103728 A1 | 4/2013 | Chapweske | |
| 2013/0247020 A1 | 9/2013 | Fontignie et al. | |
| 2014/0195754 A1* | 7/2014 | Colgrove | G06F 3/0619 |
| | | | 711/162 |
| 2014/0258662 A1 | 9/2014 | Liu | |
| 2014/0279943 A1* | 9/2014 | Shiozawa | G06F 16/2365 |
| | | | 707/690 |
| 2015/0012684 A1* | 1/2015 | Avila | G06F 3/0688 |
| | | | 711/103 |
| 2015/0309739 A1* | 10/2015 | Sato | G06F 11/1435 |
| | | | 711/162 |
| 2017/0322852 A1* | 11/2017 | Subramanya Iyer Srinivas Iyer | G06F 11/1469 |
| 2018/0095667 A1* | 4/2018 | Miller | G06F 3/0604 |

OTHER PUBLICATIONS

International Search Report and Written Opinion, International Application No. PCT/US2016/029783, dated Nov. 7, 2016, pp. 1-10, KIPO.

Scott Ciccone, "Building an Enterprise Data Hub, Evaluating infrastructure," Dec. 9, 2014, pp, 1-39 [online], Retrieved from the Internet on Jul. 20, 2015 at URL: <blogs.cisco.com/tag/c240-m3-rack-server>.

\* cited by examiner

ASSEMBLING OPERATING SYSTEM VOLUMES

BACKGROUND

A computing device may execute an operating system. An operating system may manage utilization of resources of the computing device.

BRIEF DESCRIPTION OF THE DRAWINGS

Certain examples are described in the following detailed description and in reference to the drawings, in which.

DETAILED DESCRIPTION

Figure 1:
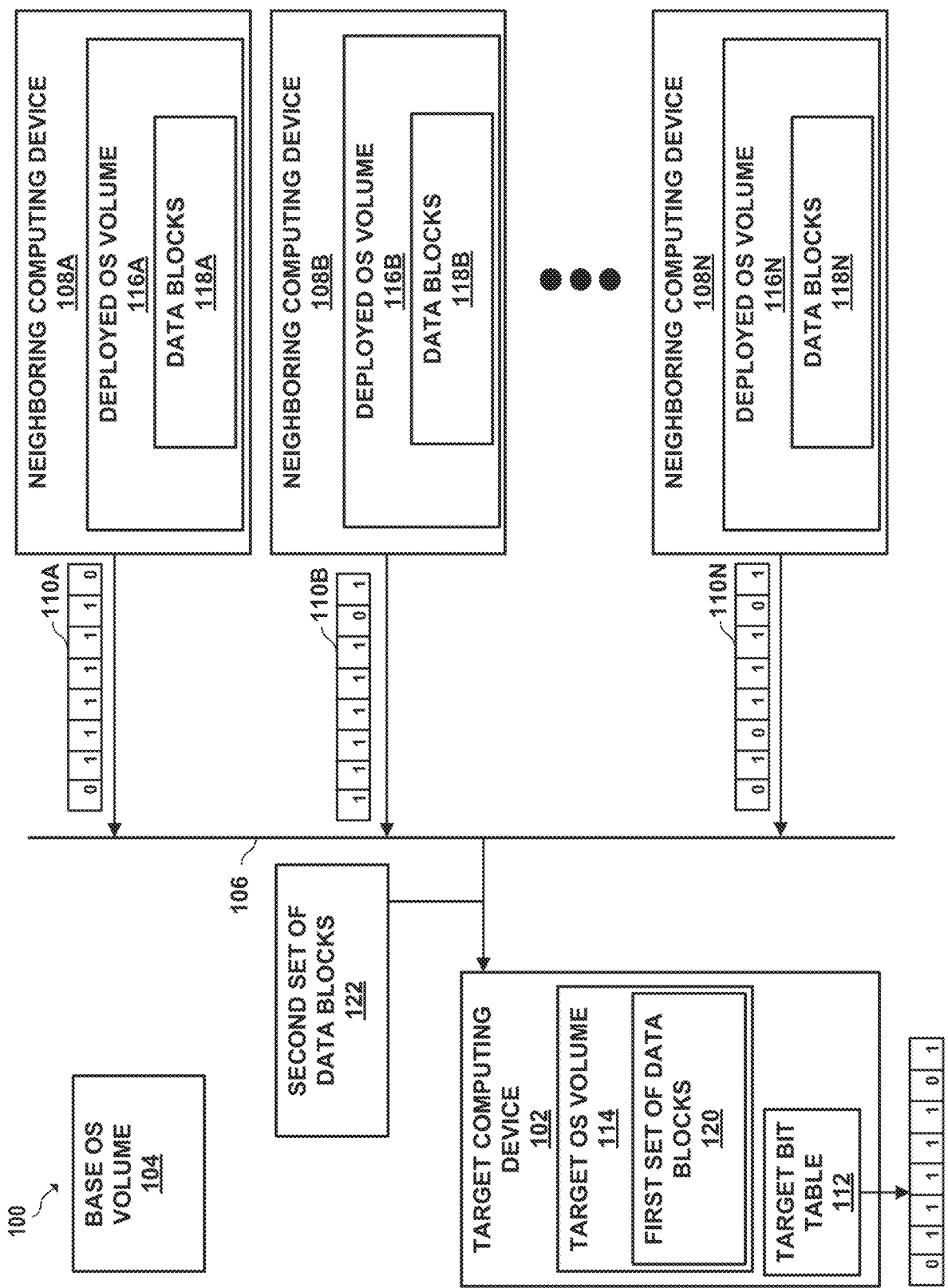
FIG. 1 is a conceptual diagram of an example computing system that may assemble operating system volumes.

Datacenters may comprise numerous computing devices, such as servers. Each of the servers executes operating systems (OSs). Each operating system must be installed before the resources of that server can be utilized. In some environments, a target computing device (e.g., a server to have to be provisioned) may request OS media, such as an OS volume to install the operating system. A provisioning computing device, such as a media server may transfer the volume to the target computing device via a link, such as a network link or the like.

Responsive to receiving a request to a request or a command, the media server may stream an OS image comprising a target OS volume for the target computing device from the media server to the target computing device. The target computing device may receive and install the OS image from the media server.

However, streaming media from a media server is relatively slow, which may result in lengthy OS install times. The media server may stream the OS image slowly due to a variety of factors. For example, the media server may be throughput-limited based on available network bandwidth. The number of simultaneous connections between computing devices being provisioned and the media server further divides the already limited network bandwidth. The OS provisioning speed of the media server may also be limited by the maximum number of input-output operations (IOPS) that the media server is provisioned with. As with network bandwidth, the IOPS of the media server is divided between each of the computing devices that the media server is currently provisioning.

This disclosure relates to rapidly provisioning an OS volume of a target computing device, such as a server, and reduces the load of media servers during provisioning. According to this disclosure, a target computing device determines a target operating system volume to be provisioned. Based on the target OS volume, the target computing device generates a bit table. Each bit of the bit table indicates whether a plurality of blocks of the target OS volume differs relative to a base OS volume.

The target server determines neighboring computing device and requests bit tables of the neighboring computing devices. The neighboring computing devices may comprise e.g., VMs on a same blade, computing devices in a same enclosure, same interconnect, same rack, and/or at a same switch level as the target computing device. The neighboring computing devices also have the same operating system version as the target OS volume to be provisioned.

By comparing corresponding bits of the target bit table and the neighboring bit tables, the target server determines a set of data blocks in neighboring OS volumes of the neighboring servers, and which correspond to a set of data blocks of the target OS volume. The target server then requests at least some of the data blocks from the neighboring computing devices, and assembles the target OS volume.

To assemble the target OS volume, the target computing device receives and stores the requested blocks in random access memory (RAM) of the target computing device, and copies the data blocks from RAM to storage coupled to the target computing device, for example based on a memory mapping.

The target computing device may receive the data blocks from multiple neighboring computing devices simultaneously, using multithreading, multiple simultaneous network connections, and/or multiple high speed interconnects, the techniques of this disclosure can rapidly decrease OS provisioning time, i.e. the time it takes to install and execute an OS volume on the target computing device. As an example, the techniques of this disclosure may reduce OS provisioning time from 45 minutes or more down to less than a minute, and may allow large numbers of servers, e.g. thousands of servers, to be provisioned concurrently.

FIG. 1 is a conceptual diagram of an example computing system that may assemble operating system volumes. Computing system 100 is illustrated in FIG. 1. Computing system 100 comprises a target computing device 102 and a plurality of neighboring computing devices 108A-108N (collectively "neighboring computing devices 108"), where N is any number. Target computing device 102 and neighboring computing devices 108 may comprise servers in various examples.

Target computing device 102 and neighboring computing devices 108 may be located in a same enclosure, e.g. in a same blade server, in a same rack, or may be connected with a same switch. In the example of FIG. 1, Target computing device 102 and neighboring computing devices 108 are connected via an interconnect 106. Interconnect 106 may comprise any number of a system-level interconnects, for example of a blade server, and/or or network connections. Interconnect 106 may provide extremely high throughput, e.g. 40 or 60 gigabits per second (gbps) or more, in various examples.

Each of neighboring computing devices 108 comprises a respective deployed OS volume 116A-116N (deployed OS volumes 116). In the example of FIG. 1, deployed OS volumes 116 may all comprise a same OS version. For example, a same version of Windows, a virtual machine host, Linux, or the like.

Each of deployed OS volumes 116 comprises respective data blocks 118A-118N (collectively "data blocks 118"). Data blocks 118 may comprise a single data block, for example 4 kilobytes (4 KB) in size, or a plurality of blocks, of an OS volume in various examples.

Based on each respective set of data blocks 118A-118N, neighboring computing devices 108A-108N may generate neighboring bit tables 110A-110N ("neighboring bit tables 110"). Each of neighboring bit tables 110 comprises a respective plurality of bits. Each of the bits indicates whether a plurality of data blocks differs relative to a corresponding plurality of data blocks of base OS volume, e.g. base OS volume 104. Each neighboring computing device may generate a respective neighboring bit table by comparing respective data blocks of a deployed OS volume with corresponding data blocks of base OS volume 104.

As an example, neighboring computing device 108A may generate neighboring bit table 110A, Each "0" bit of bit table 110A indicates that a corresponding plurality of data blocks 118A differ relative to a corresponding plurality of blocks of base OS volume 104. Each "1" bit of bit table 110A indicates that a corresponding plurality of data blocks 118A do not differ relative to a corresponding plurality of blocks of base OS volume 104.

Neighboring bit table 110A has value "01111110." It should be understood that bit table 110A may be significantly shorter than an actual bit table for the purposes of illustration and example. Bit table 110A, has first and last bits equal to 0. So, the pluralities of data blocks 118A corresponding to the first and last 0 bits differ from the corresponding pluralities of data blocks of base OS volume 104. The pluralities of data blocks 118A corresponding to the "1" bits of neighboring bit table 110A do not differ from the corresponding pluralities of blocks of base OS volume 104.

Target computing device 102 may similarly determine a target bit table 112 for a target OS volume 114 that is to be deployed. Similar to the process described above with neighboring computing devices 108, target computing device 102 may determine target bit table 112 based on whether corresponding pluralities of data blocks of target OS volume 114 differ relative to corresponding pluralities of data blocks of base OS volume 104.

Target computing device 102 may determine which computing devices comprise neighboring computing devices 108 based on an indication received from a provisioning computing device, such as a media server or provisioning appliance. Neighboring computing devices 108 have a same operating system version as an operating system of target OS volume 114. Neighboring computing devices 108 may comprise virtual machines on a same blade, computing devices connected to a same switch level, same interconnect, and/or located in a same enclosure as target computing device 102.

Target computing device 102 requests neighboring bit tables from neighboring computing devices 108. Neighboring computing devices 108 may transmit neighboring bit tables 110 to target computing device 102 via interconnect 106. Target computing device 102 compares bits of target bit table 112 to corresponding bits of each of neighboring bit tables.

If the corresponding bits of the target bit table and the neighboring bit table are equal to one, target computing device 102 determines that the corresponding pluralities of data blocks of target OS volume 114 do not differ relative corresponding data blocks of base OS volume 104. Thus, for bits of target bit table 112 that are equal to "1" and corresponding bits of neighboring bit tables 110 which have corresponding bits equal to one, the data blocks of target bit table 112 and corresponding data blocks of deployed OS volumes 116 are identical. Because the corresponding data blocks of target OS volume 114 and deployed OS volumes 116 are identical, target computing device 102 may assemble target OS volume 114 using the corresponding data blocks received from neighboring computing devices 108.

In the examples where corresponding bits of target bit table 112 and one of neighboring bit tables 110 are not equal, the corresponding data blocks of target OS volume 114 and the corresponding one of deployed OS volumes 116 are not identical, and target computing device 102 does not request or assemble target OS volume 114 based on these blocks.

If the corresponding bits of the target bit table and the neighboring bit table are equal to zero, target computing device 102 determines that the corresponding pluralities of data blocks of target OS volume 114 do differ relative corresponding data blocks of base OS volume 104. For blocks that differ relative to base OS volume 104, target computing device 102 requests the blocks from a media server, such as media server 218. Computing device 102 may assemble target OS volume 114 based on the received data blocks.

Because the corresponding data blocks of target OS volume 114 and deployed OS volumes 116 are identical, target computing device 102 may assemble target OS volume 114 using the corresponding data blocks received from neighboring computing devices 108. Target computing device 102 may request at least one of these identical blocks from one or more neighboring computing devices 108.

As a particular example, the last bit of target bit table 112 is equal to "1." Based on bit tables 110, target computing device 102 determines that the corresponding last bits of neighboring bit tables 110B and 110N are also equal to "1." Based on the determination that the corresponding last bits of neighboring bit tables 110B and 110N are equal to one, target computing device 102 may request at least some of data blocks 118B and 118N of deployed OS volumes 116B and 116N. Target computing device 102 may compare corresponding bits of target bit table 112 with corresponding bits of bit tables 110 to determine a second set of data blocks that target computing device 102 may request from neighboring computing devices 108. Target computing device 102 may request at least one block of the second set of blocks available from neighboring computing devices 108.

Thus, computing system 100 is an example of a computing system comprising a plurality of a plurality of neighboring computing devices 108, wherein each of the neighboring computing devices comprises: a respective deployed operating system (OS) volume (e.g. 116A-116N) associated with the one of the neighboring computing devices 108, and a respective neighboring bit table 110 corresponding to the respective deployed OS volume, wherein bits of the respective neighboring bit table 110 indicate whether the respective deployed OS volume 116 differ relative to a base OS volume (e.g. base OS volume 104).

Computing system 100 comprises a target computing device 102, comprising a target OS volume 114. Target computing device 102 may determine a target bit table 112 corresponding to target OS volume 114. Each bit in target bit table 112 corresponds to a data block in a first set of data blocks of target OS volume 114, and indicates whether the data block of target OS volume 114 differs relative to the base OS volume 104.

Target computing device 102 may request, from each of the neighboring computing devices 108, the respective neighboring bit tables 110 associated with each of the respective deployed OS volumes 116. Target computing device 102 may determine a second set of data blocks 120 that are included by target OS volume 114. Determining the second set of blocks is based on whether corresponding bits of neighboring bit tables 110 and target bit table 112 are equal.

Target computing device 102 requests at least one data block in the second set of data blocks 110 from neighboring computing devices 108, receives the requested at least one data block in the second set of data blocks 122 from the neighboring computing devices 108, and assembles target OS volume 114 based on the at least one data block in the second set of data blocks received from neighboring computing devices 108.

Figure 2:
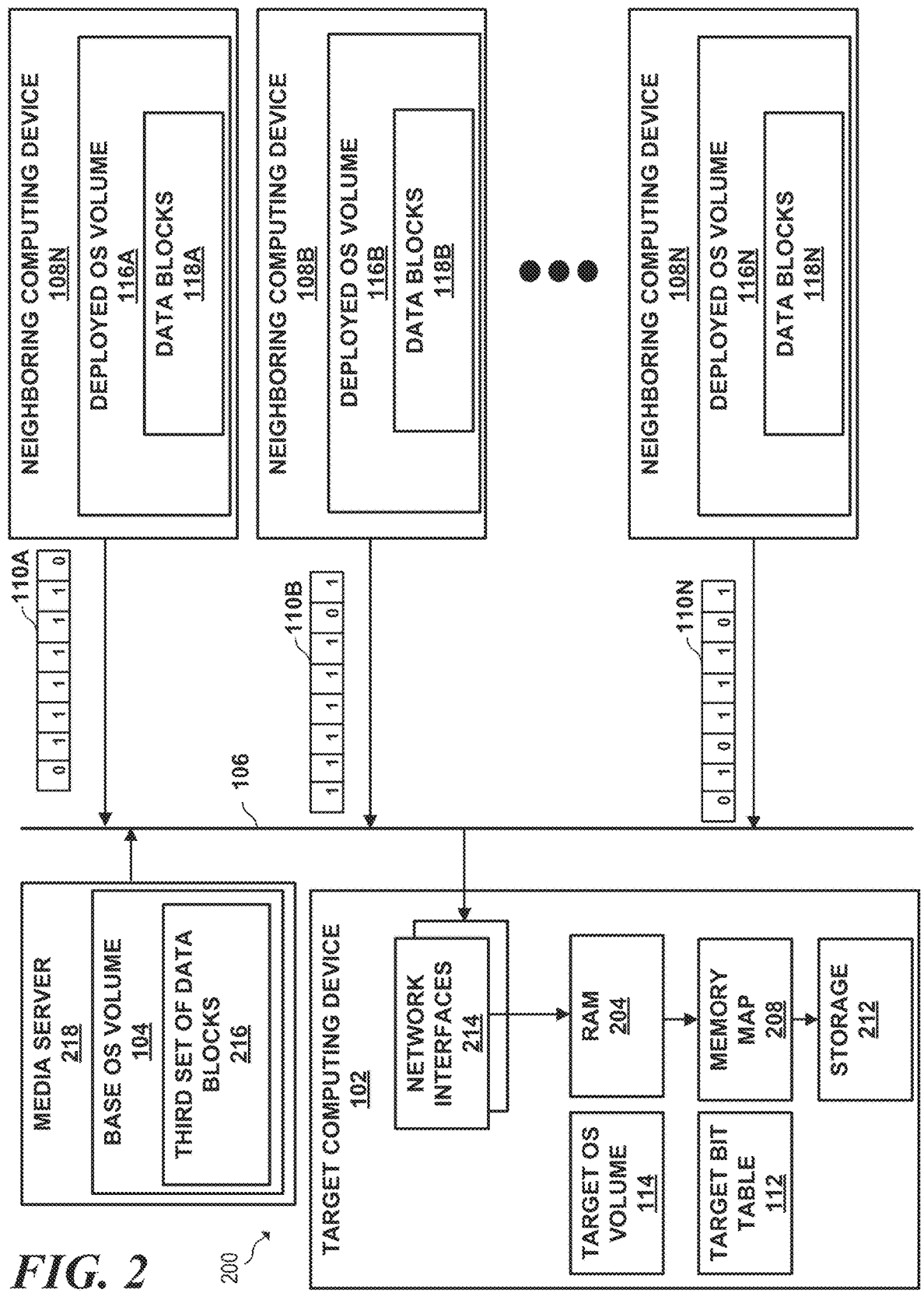
FIG. 2 is another conceptual diagram of an example computing system that may assemble operating system volumes.

FIG. 2 is another conceptual diagram of an example computing system that may perform assembling of operating system volumes. FIG. 2 illustrates a computing system 200. Computing system 200 comprises a media server 218, target computing device 102, and neighboring computing devices 108. Media server 218, target computing device 102, and neighboring computing devices 108 may be connected via interconnect 106.

In the example of FIG. 2, target computing device 102 comprises network interfaces 214, target OS volume 114, random access memory (RAM) 204, target bit table 112, memory map 208, and storage 212. Storage 212 may comprise storage that is coupled to target computing device 102.

To assemble target OS volume 114, target computing device 102 receives requested data blocks from neighboring computing devices 108 target computing device and stores the received blocks in RAM 204. Target computing device 102 may store the received at least one data block in RAM 204 using scrolling window memory mapping. In scrolling window memory mapping, received data blocks are stored into RAM 204 in a scrolling fashion, i.e. to sequential memory addresses as the blocks are received. Once the maximum addressable amount of RAM 204 has been written to, blocks at the beginning of RAM 204 are overwritten. Periodically, e.g. every 2 milliseconds, target computing device 102 may copy at least one data block stored in RAM 204 to a corresponding block of storage 212 based on a memory map 208. Memory map 208 may be stored in RAM 204, and indicates a mapping between a received data block of target OS volume 114 stored at a particular address of RAM 204 and a corresponding block address for that data block in storage 212.

Target computing device 102 may receive data blocks using network interfaces 214. Network interfaces 214 may comprise any plurality and/or different of interfaces that can communicate with interconnect 106. Target computing device 102 may receive requested data blocks, e.g. data blocks of second set of data blocks 122 using the plurality of network interfaces 214. In various examples, target computing device 102 may initiate separate connection with each of neighboring computing devices 108 and/or media server 218 from which target computing device 102 receives data blocks. Target computing device 102 may execute a separate thread for each connection of network interfaces 214 used to receive data blocks in various examples.

Responsive to receiving a request to transmit data blocks 118 of deployed OS volumes 116, media server 218 may determine a resource utilization, such as central processing unit (CPU) usage, IO utilization (e.g. IOPS), network bandwidth, network interface card (NIC) occupancy, memory usage or the like, of neighboring computing devices 108. Based on the determined resource utilization, media server 218 may indicate and/or target computing device 102 may determine a number of the second set of data blocks to request from neighboring computing devices 108. Neighboring computing devices 108 having higher resource utilizations may transmit fewer data blocks in various examples. Thus, neighboring computing devices 108 may transmit the at least one blocks of second set of data blocks 122 based on resource utilizations of neighboring computing devices 108.

Media server 218 may store base OS volume 104, and may transmit information, related to base OS volume 104, such as a bit table of base OS volume 104, to target computing device 102. In various examples, based on whether a bit of table bit table 112 is not equal to any of the corresponding bits of each of neighboring bit tables 110, target computing device 102 may determine that a data block of target OS volume 114 is unavailable from neighboring computing devices 108. Responsive to determining that the data block is unavailable, target computing device 102 may request the unavailable data block from media server 218. Target computing devices 102 may receive the requested data block from media server 218, and assemble target OS volume 114 based on the received data block.

In various examples, media server 218 may determine neighboring computing devices 108. Media server 218 may determine neighboring computing devices 108 based on whether a computing devices is a VM on a same blade as target computing device 102, and/or whether the computing device is in a same enclosure, same interconnect, and/or same rack, and/or at a same switch level as target computing device 102. Media server 218 may also determine that a computing device is a neighboring computing device based on whether the computing device has a same operating system version as target OS volume 114, which is to be provisioned.

Media server 218 may determine an ordering of which of neighboring computing devices 108 is closest (i.e. will have the highest volume transfer throughput) to target computing device 102. Media server 218 may generate an indication of the ordering and transmit the ordering to target computing device 102. Media server 218 may also generate an indication of a number of blocks for target computing device 102 to fetch from neighboring computing devices 108 based on resource utilization, as described above.

Figure 3:
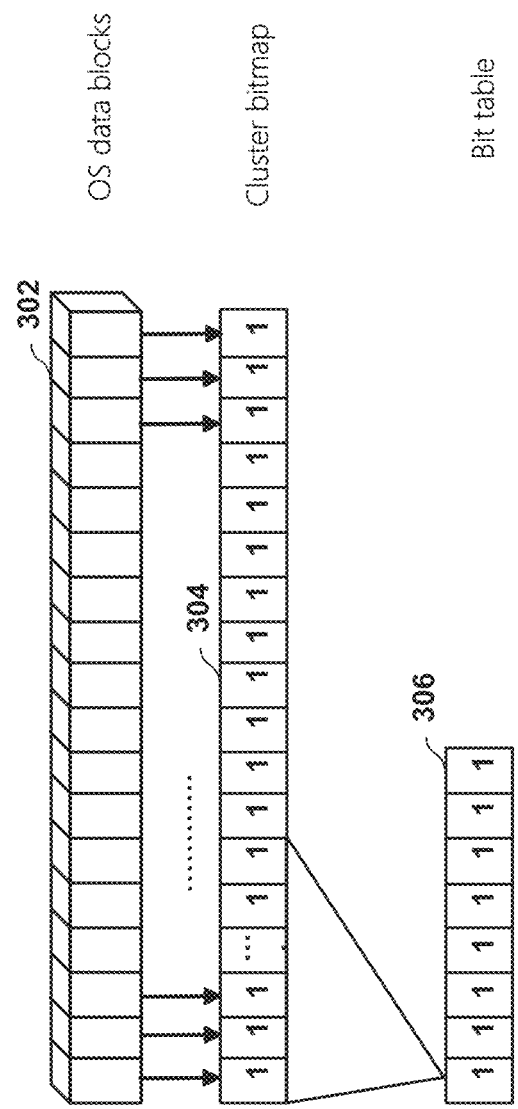
FIG. 3 is another conceptual diagram of an example computing system that may assemble operating system volumes.

FIG. 3 is a conceptual diagram that may illustrate an example of data blocks, bitmaps, and bit tables. FIG. 3 illustrates a computing system 300. Computing system 300 comprises OS data blocks 302. OS data blocks 302 may comprise data blocks as described in this disclosure. OS data blocks 302 may comprise operating system information and may exclude information which differs significantly from one computing device to another, such as application data in various examples. Each of OS data blocks 302 may comprise a 4 kilobyte block, which is logically addressable by a computing device.

Based on each of OS data blocks 302, a computing device, such as target computing device, media server 218, and/or neighboring computing device 108, may generate a cluster bitmap 304. Each bit of cluster bitmap 304 corresponds to a data block of OS data blocks 302. Each bit of cluster bitmap 304 also indicates whether the corresponding data block differs relative a base OS volume, such as base OS volume 104. Each of neighboring computing devices 108, target computing device 102, and/or media server 218 may determine a respective bit table, such as bit table 306, based on a respective cluster bitmap, e.g. cluster bitmap 304. Bit table 306 may comprise a 16 byte value in various examples. A computing may allocate a dedicated network port for other computing devices to query the bit table and/or cluster bitmap in various examples As an example of determining a cluster bitmap, a computing device, such as neighboring computing device 108A may calculate each bit of bit table 306 based on a plurality of corresponding bits of cluster bitmap 304 based on set/intersection logic. For example, the first (leftmost) bit of bit table 306 is equal to "1" if all the plurality of corresponding bits of cluster bitmap 304 are equal to "1." However, if any of the corresponding plurality of bits of cluster bitmap 304 are equal to zero, the corresponding bit of bit table 306 is equal to zero.

In various examples, an IO subsystem of a computing device, such as one of neighboring computing devices 108, may determine when a block of an OS volume, such as one of data blocks 118, changes. The IO subsystem may detect that a write to an address associated with a data block of the operating system has occurred. Based on the detected write, the IO subsystem may determine whether to update a corresponding bit of cluster bitmap 304 based on whether the written data block differs relative to the base OS volume. The IO subsystem may further determine whether to update a corresponding bit of bit table 306, which is based on the corresponding bit of cluster bitmap 304.

Figure 4:
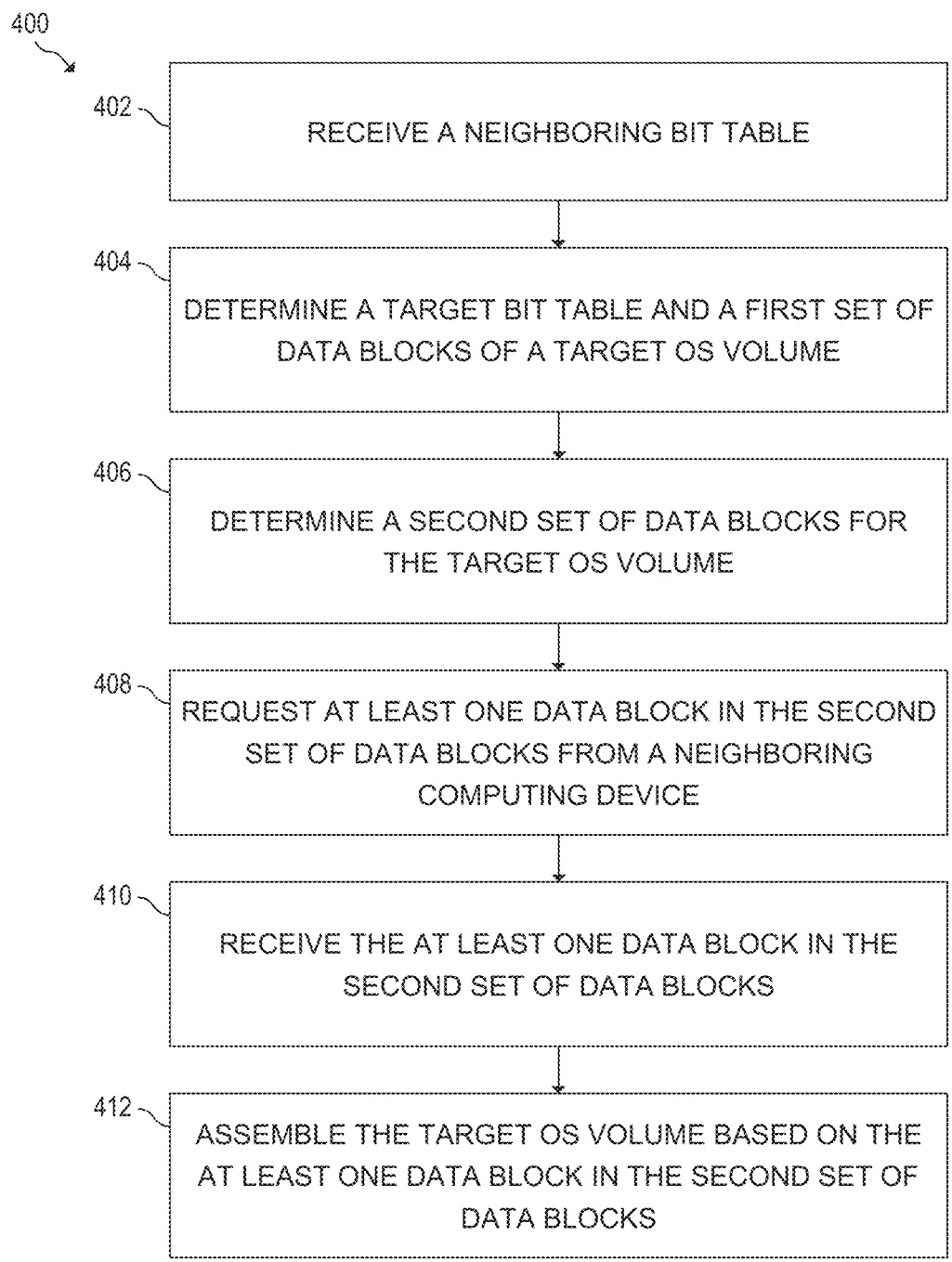
FIG. 4 is a flowchart of an example method for assembling operating system volumes.

FIG. 4 is a flowchart of an example method for assembling operating system volumes. FIG. 4 comprises method 400. Method 400 may be described below as being executed or performed by a system, for example, computing system 100 (FIG. 1), or computing system 200 (FIG. 2). In various examples, method 400 may be performed by hardware, software, firmware, or any combination thereof. Other suitable systems and/or computing devices may be used as well. Method 400 may be implemented in the form of executable instructions stored on at least one machine-readable storage medium of the system and executed by at least one processor of the system. In various examples, the machine-readable storage medium is non-transitory. Alternatively or in addition, method 400 may be implemented in the form of electronic circuitry (e.g., hardware). In alternate examples of the present disclosure, one or more blocks of method 400 may be executed substantially concurrently or in a different order than shown in FIG. 4. In alternate examples of the present disclosure, method 400 may include more or fewer blocks than are shown in FIG. 4. In some examples, one or more of the blocks of method 400 may, at certain times, be ongoing and/or may repeat.

Method 400 may start at block 402 at which point a computing device of the computing system, e.g. target computing device 102, may receive a neighboring bit table (e.g. neighboring bit table 110A) corresponding to a deployed operating system (OS) volume (e.g. deployed OS volume 116A) of a neighboring computing device (e.g. neighboring computing device 108A), wherein each bit in neighboring bit table 110A corresponds to a data block of deployed OS volume 116A and indicates whether the data block of the deployed OS volume differs relative to a base OS volume (e.g. base OS volume 104).

Method 400 may proceed to block 404 at which point target computing device 102 may determine a target bit table (e.g. target bit table 112) corresponding to a target OS volume (e.g. target OS volume 114) of target computing device 102, wherein each bit in target bit table 112 corresponds to a data block of a first set of data blocks 120 of target OS volume 114 and indicates whether the data block of target OS volume 114 differs relative to the base OS volume 104.

Method 400 may proceed to block 406, where target computing device 102 may proceed to determine a second set of data blocks 122 of target OS volume 114 that are included by deployed OS volume 116A. Determining the second set of data blocks 122 may be based on based on whether corresponding bits of neighboring bit table 110A and target bit table 112 are equal. Second set of data blocks 122 are a subset of first set of data blocks 120.

Method 400 may proceed to block 408, where target computing device 102 may request at least one data block in the second set of data blocks 122 from neighboring computing device 108A. Method 400 may proceed further to block 410, where target computing device 102 may receive the at least one data block in the second set of data blocks 122 from neighboring computing device 108A. Method 400 may proceed to block 412, where target computing device 102 may assemble target OS volume 114 based on the at least one data block in the second set of data blocks 122 received from neighboring computing device 108A.

Figure 5:
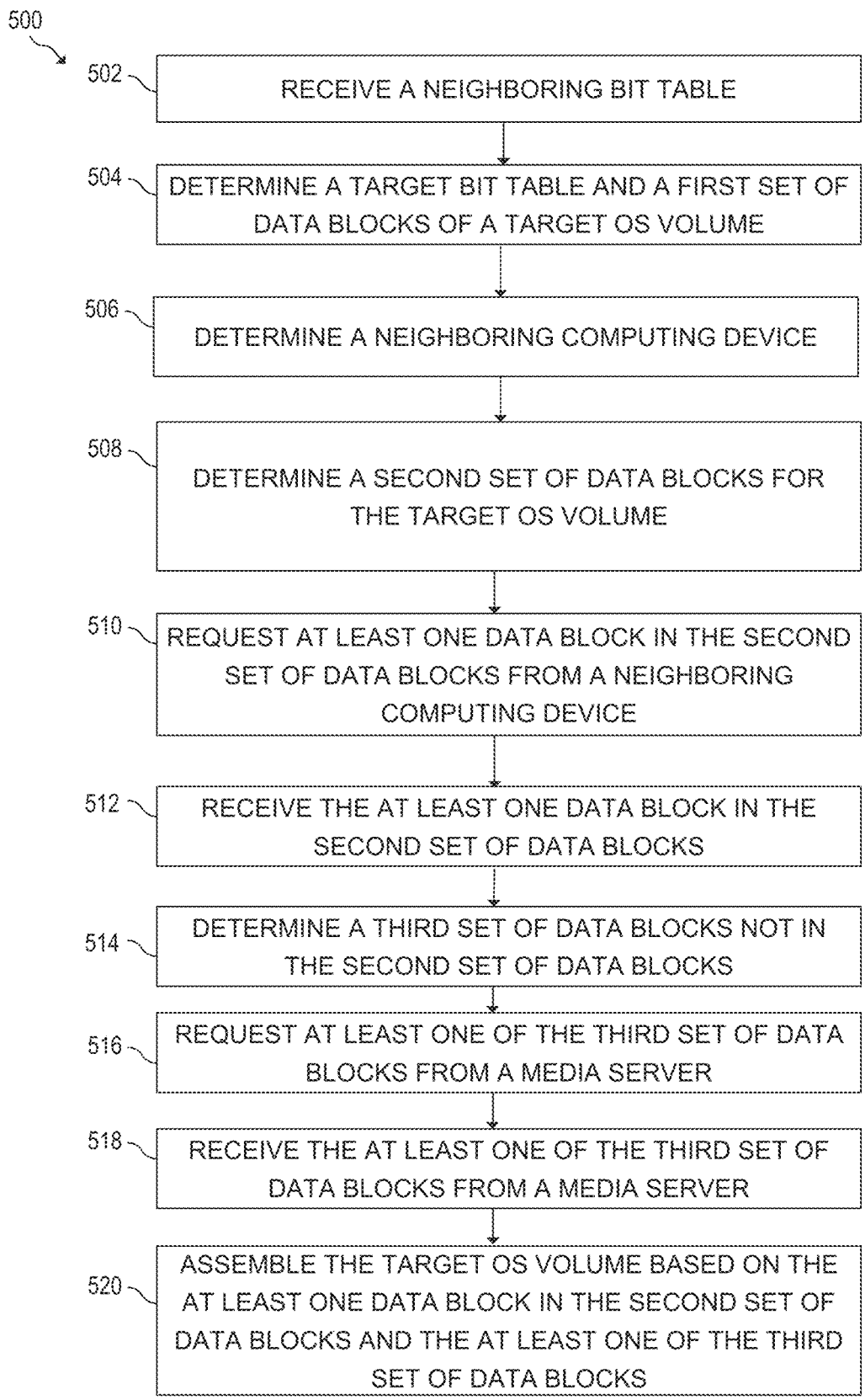
FIG. 5 is a flowchart of an example method for assembling operating system volumes.

FIG. 5 is a flowchart of an example method for assembling operating system volumes. FIG. 5 illustrates method 500. Method 500 may be described below as being executed or performed by a system, for example, computing system 100 (FIG. 1) or computing system 200 (FIG. 2). Other suitable systems and/or computing devices may be used as well. Method 500 may be implemented in the form of executable instructions stored on at least one machine-readable storage medium of the system and executed by at least one processor of the system. Method 500 may be performed by hardware, software, firmware, or any combination thereof.

Alternatively or in addition, method 500 may be implemented in the form of electronic circuitry (e.g., hardware). In alternate examples of the present disclosure, one or more blocks of method 500 may be executed substantially concurrently or in a different order than shown in FIG. 5. In alternate examples of the present disclosure, method 500 may include more or fewer blocks than are shown in FIG. 5. In some examples, one or more of the blocks of method 500 may, at certain times, be ongoing and/or may repeat.

In various examples, method 500 may start at block 502, at which Method 50 may start at block 502 at which point a computing device of the computing system, e.g. target computing device 102, may receive a neighboring bit table (e.g. neighboring bit table 110A) corresponding to a deployed operating system (OS) volume (e.g. deployed OS volume 116A) of a neighboring computing device (e.g. neighboring computing device 108A), wherein each bit in neighboring bit table 110A corresponds to a data block of deployed OS volume 116A and indicates whether the data block of the deployed OS volume differs relative to a base OS volume (e.g. base OS volume 104).

Method 500 may proceed to block 504 at which point target computing device 102 may determine a target bit table (e.g. target bit table 112) corresponding to a target OS volume (e.g. target OS volume 114) of target computing device 102, wherein each bit in target bit table 112 corresponds to a data block of a first set of data blocks 120 of target OS volume 114. Each bit of target bit table 112 also indicates whether the corresponding data block of target OS volume 114 differs relative to base OS volume 104.

Method 500 may proceed to block 506, where target computing device 102 may determine a neighboring computing device, e.g. neighboring computing device 108N. To determine whether a computing device is a neighboring computing device, target computing device 102 or media server 218 may determine whether a computing device is located in at least one of: a same rack as target computing device 102, a same enclosure as target computing device 102, and/or is connected to a same switch as target computing device 102. Target computing device 102 or media server 218 may further determine that a computing device is a neighboring computing device if the computing device also has a same operating system version as target computing device 102.

Method 500 may proceed to block 508, where target computing device 102 may proceed to determine a second set of data blocks 122 of target OS volume 114 that are included by deployed OS volume 116A. Second set of data blocks 122 may be a subset of first set of data blocks 120. Determining the second sec of blocks is based on whether corresponding bits of neighboring bit table 110A and target bit table 112 are equal.

Method 500 may proceed to block 510, where target computing device 102 may request at least one data block in the second set of data blocks 122 from neighboring computing device 108A. Method 500 may proceed further to block 512, where target computing device 102 may receive the at least one data block in the second set of data blocks 122 from neighboring computing device 108A.

Method 500 may proceed to block 514, where target computing device 102 may determine, based on whether the corresponding bits of the neighboring bit table 110N and target bit table 112 are equal, a third set of data blocks 216 not in the second set of data blocks of the deployed OS volume. Method 500 may proceed to block 516, at which point target computing device 102 may request from a media server (e.g. media server 218), at least one data block of third set of data blocks 216. Method 500 may proceed to block 518 at which point target computing device 102 may receive the at least one data block of the third set of data blocks 216 from media server 218.

Method 500 may proceed to block 520, where target computing device 102 may assemble target OS volume 114 based on the at least one data block in the second set of data blocks 122 received from neighboring computing device 108A. In some examples, to assemble target OS volume 114, target computing device 102 may store the at least one data block in the second set of data blocks 122 in RAM 204 of target computing device 102. To store the at least one data block in the second set of data blocks, target computing device 102 may use a scrolling window memory mapping. To assemble target OS volume 114, target computing device 102 may also copy, based on the memory mapping, the at least one data block of the target OS stored in RAM 204 to corresponding blocks of a storage device (e.g. storage 212) of target computing device 102.

Figure 6:
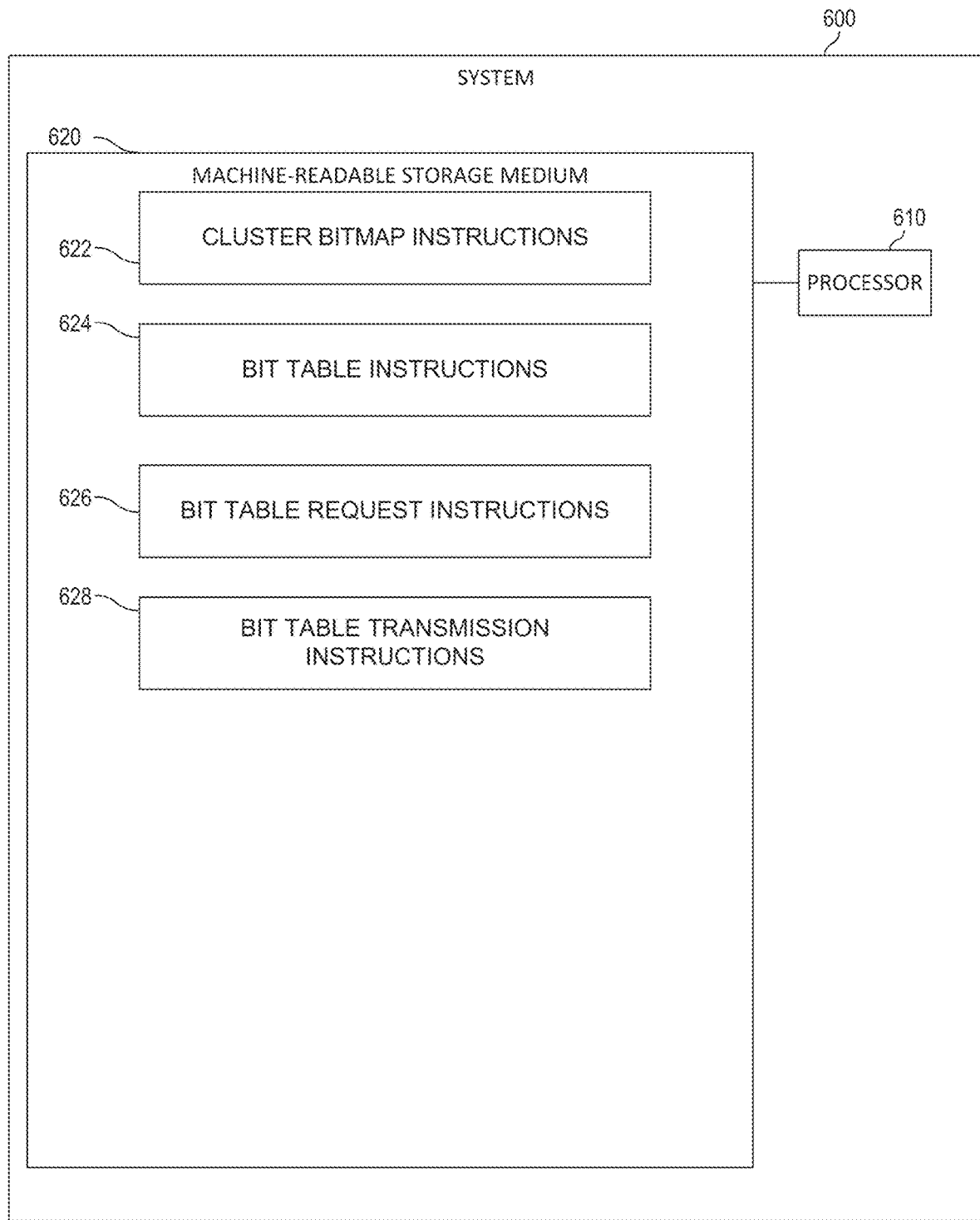
FIG. 6 is a block diagram of an example for assembling operating system volumes.

FIG. 6 is a block diagram of an example for assembling operating system volumes. In the example of FIG. 6, system 600 includes a processor 610 and a machine-readable storage medium 620. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 610 may be one or more central processing units (CPUs), microprocessors, and/or other hardware devices suitable for retrieval and execution of instructions stored in machine-readable storage medium 620. In the particular example shown in FIG. 6, processor 610 may fetch, decode, and execute instructions 622, 624, 626, 628 to assemble operating system volumes.

As an alternative or in addition to retrieving and executing instructions, processor 610 may include one or more electronic circuits comprising a number of electronic components for performing the functionality of one or more of the instructions in machine-readable storage medium 620. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 620 may be any electronic, magnetic, optical, or other physical storage device that stores executable instructions. Thus, machine-readable storage medium 620 may be, for example, Random Access Memory (RAM), an Electrically-Erasable Programmable Read-Only Memory (EEPROM), a storage drive, an optical disc, and the like. Machine-readable storage medium 620 may be disposed within system 600, as shown in FIG. 6. Machine-readable medium 620 is non-transitory in various examples. In this situation, the executable instructions may be "installed" on the system 600. Alternatively, machine-readable storage medium 620 may be a portable, external or remote storage medium, for example, that allows system 600 to download the instructions from the portable/external/remote storage medium.

Referring to FIG. 6, cluster bitmap instructions 622 when executed by a processor, e.g. processor 610, may cause processor 610 to determine, by a computing device (e.g. neighboring computing device 108A or the like), a cluster bitmap (e.g. cluster bitmap 304) of FIG. 2, wherein each bit of the cluster bitmap indicates whether a data block (e.g. OS data blocks 302 or data blocks 118A) of a deployed operating system (OS) volume (e.g. deployed OS volume 116A) of a computing device differs from a base operating system volume (e.g. base OS volume 104).

Bit table instructions 624, when executed, may cause processor 610 to determine, based on the cluster bitmap, a bit table (e.g., bit table 306 illustrated in FIG. 3 or bit table 110A illustrated in FIG. 1). Each bit of the bit table indicates whether a corresponding plurality of data blocks (e.g. OS data blocks 302 illustrated in FIG. 3 or data blocks 118A illustrated in FIG. 1) of the deployed OS volume differ from the base OS volume. Each bit of the bit table may correspond to a plurality of bits of the cluster bitmap.

In various examples, bit table instructions 624 may comprise instructions that, when executed, may cause processor 610 to modify, a data block of the deployed OS volume, detect, by an IO subsystem of the computing device, that the data block of the volume has changed relative to a base operating system volume, modify, by the IO subsystem, a bit of the cluster bitmap corresponding to an address of the modified data block to indicate that the cluster has changed relative to the base OS volume, and modify, by the IO subsystem, a bit of the bit table corresponding to the modified data block of the deployed volume.

Bit table request instructions 626, when executed, may cause processor 610 to receive a request for the bit table from a requesting computing device, e.g. target computing device 102, and bit table transmission instructions 628, when executed, may cause processor 610 to transmit the bit table to the requesting computing device.

Figure 7:
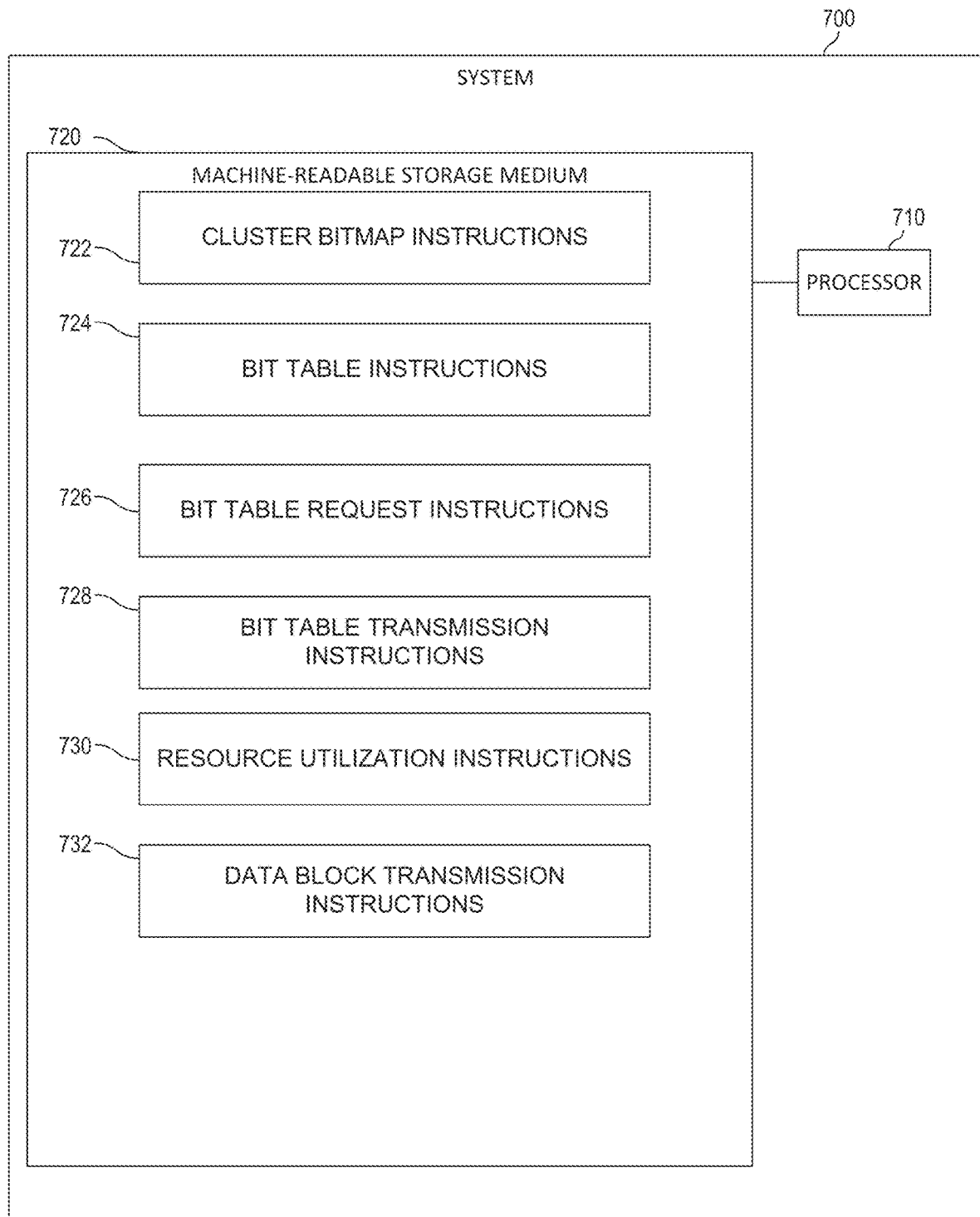
FIG. 7 is a block diagram of an example for assembling operating system volumes.

FIG. 7 is a block diagram of an example for assembling operating system volumes. In the example of FIG. 7, system 700 includes a processor 710 and a machine-readable storage medium 720. Although the following descriptions refer to a single processor and a single machine-readable storage medium, the descriptions may also apply to a system with multiple processors and multiple machine-readable storage mediums. In various examples, machine-readable storage medium 720 is non-transitory. In such examples, the instructions may be distributed (e.g., stored) across multiple machine-readable storage mediums and the instructions may be distributed (e.g., executed by) across multiple processors.

Processor 710 may be one or more central processing units (CPUs), microprocessors, and/or other hardware devices suitable for retrieval and execution of instructions stored in machine-readable storage medium 720. In the particular example shown in FIG. 7, processor 710 may fetch, decode, and execute instructions 722, 724, 726, 728, 730 732 to assemble operating system volumes.

As an alternative or in addition to retrieving and executing instructions, processor 710 may include one or more electronic circuits comprising a number of electronic components for performing the functionality of one or more of the instructions in machine-readable storage medium 720. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 720 may be any electronic, magnetic, optical, or other physical storage device that stores executable instructions. Thus, machine-readable storage medium 720 may be, for example, Random Access Memory (RAM), an Electrically-Erasable Programmable Read-Only Memory (EEPROM), a storage drive, an optical disc, and the like. Machine-readable storage medium 720 may be disposed within system 700, as shown in FIG. 7. In this situation, the executable instructions may be "installed" on the system 700. Alternatively, machine-readable storage medium 720 may be a portable, external or remote storage medium, for example, that allows system 700 to download the instructions from the portable/external/remote storage medium.

Referring to FIG. 7, cluster bitmap instructions 722 when executed by a processor, e.g. processor 710, may cause processor 710 to determine, by a computing device (e.g. neighboring computing device 108A or the like), a cluster bitmap (e.g. cluster bitmap 304) of FIG. 2, wherein each bit of the cluster bitmap indicates whether a data block (e.g. OS data blocks 302 or data blocks 118A) of a deployed operating system (OS) volume (e.g. deployed OS volume 117A) of a computing device differs from a base operating system volume (e.g. base OS volume 104).

Bit table instructions 724, when executed, may cause processor 710 to determine, based on the cluster bitmap, a bit table (e.g., bit table 306 illustrated in FIG. 3 or bit table 110A illustrated in FIG. 1). Each bit of the bit table indicates whether a corresponding plurality of data blocks (e.g. OS data blocks 302 illustrated in FIG. 3 or data blocks 118A illustrated in FIG. 1) of the deployed OS volume differ from the base OS volume. Each bit of the bit table may correspond to a plurality of bits of the cluster bitmap.

Bit table request instructions 726, when executed, may cause processor 710 to receive a request for the bit table from a requesting computing device, e.g. target computing device 102, and bit table transmission instructions 728, when executed, may cause processor 710 to transmit the bit table to the requesting computing device.

In various examples, machine-readable storage medium 720 may comprise resource utilization instructions 730 and/or data block transmission instructions 732. Resource utilization instructions 730, when executed, may cause processor 710 to determine, by the computing device, a resource utilization of the computing device (e.g. a load of neighboring computing device 108A). In various examples, processor 710 may execute data block transmission instructions 732 when, executed, cause processor 710 to transmit by the computing device and to the requesting computing device (e.g. to target computing device 102), a number of the requested data blocks, wherein the number of the transmitted data blocks is based on the resource utilization of the computing device.

The invention claimed is:
1. A method, comprising:
receiving, by a computing device, a neighboring bit table corresponding to a deployed operating system (OS) volume of a neighboring computing device, wherein each bit in the neighboring bit table corresponds to a data block of the deployed OS volume and indicates whether the data block of the deployed OS volume differs relative to a base OS volume;
determining, by the computing device, a target bit table corresponding to a target OS volume of the computing device, wherein each bit in the target bit table corresponds to a data block of a first set of data blocks of the target OS volume and indicates whether the data block of the target OS volume differs relative to the base OS volume;
determining, by the computing device, a second set of data blocks of the target OS volume that are included by the deployed OS, wherein the determining is based on whether corresponding bits of the neighboring bit table and the target bit table are equal, and the second set is a subset of the first set;
requesting, by the computing device, at least one data block in the second set from the neighboring computing device;
receiving, at the computing device, the at least one data block from the neighboring computing device;
assembling, by the computing device, the target OS volume based on the at least one data block received from the neighboring computing device;
determining, by the computing device and based on whether the corresponding bits of the neighboring bit table and the target bit table are equal, a third set of data blocks not in the second set of data blocks of the deployed OS volume;
requesting, by the computing device and from a media server, at least one data block of the third set of data blocks; and
receiving, by the computing device and from the media server, the at least one data block of the third set of data blocks.

2. The method of claim 1, wherein assembling the target operating system volume comprises:
storing, by the computing device, the at least one data block in the second set of data blocks received from the neighboring computing device in random access memory (RAM) of the target computing device using scrolling window memory mapping; and
copying, by the computing device and based on the memory mapping, the at least one data block of the target OS stored in the RAM to corresponding blocks of a storage device of the target computing device.

3. The method of claim 1, comprising:
determining, by the computing device, that the neighboring computing device is located in at least one of:

a same rack as the target computing device, a same enclosure as the target computing device, or is connected at a same switch level as the target computing device; and determining, by the computing device, that the neighboring computing device has a same operating system version as the target operating system volume.

4. A system comprising:

a plurality of neighboring computing devices, wherein each of the neighboring computing devices comprises:
   a respective deployed operating system (OS) volume associated with the one of the neighboring computing devices; and
   a respective neighboring bit table corresponding to the respective deployed OS volume, wherein bits of the respective neighboring bit table indicate whether the respective deployed OS volume differs relative to a base OS volume;

a target computing device comprising:
   a target OS volume;
   the target computing device to:
      determine a target bit table corresponding to the target OS volume, wherein each bit in the target bit table corresponds to a data block of a first set of data blocks of the target OS volume and indicates whether the data block of the target OS volume differs relative to the base OS volume;
      request, from the neighboring computing devices, the respective neighboring bit tables;
      determine a second set of data blocks of the target OS volume that are included by the deployed OS volumes, wherein to determine the second set is based on whether corresponding bits of the neighboring bit tables and bits of the target bit table are equal;
      request at least one data block in the second set from the neighboring computing devices;
      receive the requested at least one data block from the neighboring computing devices; and
      assemble the target OS volume based on the at least one data block received from the neighboring computing devices,
   wherein each of the neighboring computing devices comprise:
   a cluster bitmap,
   wherein each bit of the cluster bitmap corresponds to a data block of one of the respective deployed OS volumes, and
   wherein each bit of the cluster bitmap indicates whether a corresponding data block of the one of the respective deployed OS volumes differs relative to a base OS volume,
   each of the plurality of neighboring computing devices to:
      determine a respective one of the bit tables based on a respective one of the cluster bitmaps.

5. The system of claim 4, wherein the target computing device comprises random access memory (RAM);
   wherein to assemble the target OS volume based on the received at least one data block, the target computing device to:
      store the received at least one data block in the second set of data blocks in the RAM using scrolling window memory mapping; and
      copy the at least one data block stored in the RAM to corresponding clusters of the target OS volume based on a memory map associated with the target OS bit table.

6. The system of claim 4, wherein the target computing device comprises a plurality of network interfaces, the target computing device to:
   receive the requested data at least one data block in the second set of data blocks using the plurality of network interfaces.

7. The computing system of claim 4, the neighboring computing devices to:
   transmit the at least one data block in the second set of data blocks of the deployed OS volumes based on resource utilizations of the neighboring computing devices.

8. The system of claim 4,
   wherein the neighboring computing devices are in a same rack as the target computing device, a same enclosure as the target computing device, or are connected at a same switch level as the target computing device, and
   wherein the neighboring computing devices have a same operating system version as the target operating system volume.

9. The system of claim 4, comprising:
   a media server;
   wherein the target computing device to:
      determine, based on whether a bit of the target bit table is not equal to any of the corresponding bits of the respective neighboring bit tables, that a data block of the target OS volume is unavailable from each of the plurality of neighboring computing devices; and
      responsive to determining that the data block is unavailable, request the unavailable data block from the media server;
      receive, from the media server, the data block requested from the media server; and
      assemble the target OS volume based on the data block received from the media server.

10. A non-transitory machine-readable storage medium encoded with instructions, the instructions that, when executed, cause a processor to:
   determine, by a computing device, a cluster bitmap, wherein each bit of the cluster bitmap indicates whether a data block of a deployed operating system (OS) volume of a computing device differs from a base operating system volume;
   determine, by the computing device and based on the cluster bitmap, a bit table
   wherein each bit of the bit table indicates whether a corresponding plurality of data blocks of the deployed OS volume differ from the base OS volume, and wherein each bit of the bit table corresponds to a plurality of bits of the cluster bitmap;
   receive, by the computing device, a request for the bit table from a requesting computing device; and
   transmit, by the computing device, the bit table to the requesting computing device,
   wherein the instructions that cause the processor to determine the bitmap comprise instructions that, when executed, cause the processor to:
   modify, by the computing device, a data block of the deployed OS volume;
   detect, by an IO subsystem of the computing device, that the data block of the volume has changed relative to a base operating system volume;
   modify, by the IO subsystem, a bit of the cluster bitmap corresponding to an address of the modified data block to indicate that the cluster has changed relative to the base OS volume; and modify, by the IO subsystem, a bit of the bit table corresponding to the modified data block of the deployed volume.

11. The non-transitory machine-readable storage medium of claim 10, comprising instructions that, when executed, cause the processor to:
responsive to receiving a request for data blocks of the OS volume, transmit the requested data blocks of the OS volume to the requesting computing device.

12. A non-transitory machine-readable storage medium encoded with instructions, the instructions that, when executed, cause a processor to:
determine, by a computing device, a cluster bitmap, wherein each bit of the cluster bitmap indicates whether a data block of a deployed operating system (OS) volume of a computing device differs from a base operating system volume;
determine, by the computing device and based on the cluster bitmap, a bit table wherein each bit of the bit table indicates whether a corresponding plurality of data blocks of the deployed OS volume differ from the base OS volume, and wherein each bit of the bit table corresponds to a plurality of bits of the cluster bitmap;
receive, by the computing device, a request for the bit table from a requesting computing device;
transmit, by the computing device, the bit table to the requesting computing device;
determine, by the computing device, a resource utilization of the computing device; and
transmit, by the computing device and to the requesting computing device, a number of the requested data blocks, wherein the number of the transmitted data blocks is based on the resource utilization the computing device.

* * * * *